United States Patent [19]

Barbee et al.

[11] Patent Number: 4,714,558
[45] Date of Patent: Dec. 22, 1987

[54] WASTEWATER TREATMENT SYSTEM

[75] Inventors: Tom D. Barbee; James Ufheil, both of Louisville, Ky.

[73] Assignee: The Barbee Co., Inc., Louisville, Ky.

[21] Appl. No.: 847,241

[22] Filed: Apr. 2, 1986

[51] Int. Cl.⁴ .................. B01D 21/02; B01D 23/02; B01D 25/02

[52] U.S. Cl. .................. 210/776; 210/802; 210/805; 210/806; 210/167; 210/195.1; 210/196; 210/258; 210/259; 210/305; 55/DIG. 46; 134/111

[58] Field of Search .............. 210/776, 801, 802, 805, 210/167, 195.1, 196, 258, 259, 299, 305, 169, 806; 55/DIG. 46; 134/111

[56] References Cited

U.S. PATENT DOCUMENTS

| | | | |
|---|---|---|---|
| 853,217 | 5/1907 | Bordigoni | 210/299 |
| 1,459,921 | 6/1923 | Nagel | 210/299 |
| 1,646,102 | 10/1927 | Ostrander | 210/305 |
| 1,652,620 | 12/1927 | Fox | 210/299 |
| 2,799,645 | 7/1957 | Musgrove | 210/801 |
| 3,239,438 | 3/1966 | Voorhees | 210/167 |
| 3,732,160 | 5/1973 | Klock | 210/196 |
| 3,774,625 | 11/1973 | Wiltrout | 210/167 |
| 3,811,572 | 5/1974 | Tatterson | 210/167 |
| 3,862,040 | 1/1975 | Preus | 210/776 |
| 3,970,560 | 7/1976 | Metzer | 210/167 |
| 4,056,114 | 11/1977 | Boutilette | 210/167 |
| 4,176,062 | 11/1979 | Husher | 210/776 |
| 4,282,094 | 8/1981 | Mitchell | 210/167 |
| 4,362,628 | 12/1982 | Kennedy | 210/167 |
| 4,378,290 | 3/1983 | Kennedy | 210/258 |
| 4,427,548 | 1/1984 | Quick | 210/169 |
| 4,464,256 | 8/1984 | Plourde | 210/167 |

FOREIGN PATENT DOCUMENTS 2556674  8/1976  Fed. Rep. of Germany ...... 210/167

Primary Examiner—Ernest G. Therkorn
Attorney, Agent, or Firm—Larson and Taylor

[57] ABSTRACT

A method and apparatus for treating wastewater from a cleaning tank or the like is provided. A settling tank provides for separating the fluid and sludge, the sludge being passed to a filtration system having a plurality of filter trays with the filtrate being recycled to the settling tank. The decontaminated water from the settling tank is recycled to the cleaning tank.

5 Claims, 4 Drawing Figures

WASTEWATER TREATMENT SYSTEM

FIELD OF THE INVENTION

The present invention relates to a method and apparatus for treating wastewater from a cleaning tank or the like.

BACKGROUND OF THE INVENTION

It is common practice, particularly in the automotive repair business, to provide cleaning or painting tanks in which the object, such as an automotive radiator, is placed within the tank and the cleaning liquid is collected within the tank and conventionally is allowed to go into the sewer system. Because of the large quantity of contaminates in such wastewater restrictions are being imposed to prevent the dumping of such contaminated and hazardous sludge into the sewer system.

There have been provided systems for cleaning stations for wastewater and recycling of the cleaning fluid in connection with the cleaning and repair of automotive parts. The Powell U.S. Pat. No. 2,222,516 and Williams U.S. Pat. No. 3,094,131 disclose vehicle cooling system cleaning methods and apparatus for treating the wastewater from such cleaning methods including a recycling step. The Fisher U.S. Pat. No. 2,677,381 and Korbet U.S. Pat. No. 4,453,556 also disclose spray cleaning apparatuses which involve stations with filtering and recycling of cleaning fluids. Prior art patents which disclose systems for cleaning specific automotive parts and involve recirculating of the cleaning solvent are Arrigo U.S. Pat No. 3,584,633, Neill U.S. Pat. No. 3,526,237, Lawter U.S. Pat. No. 3,379,018, Cockrell U.S. Pat. No. 2,660,744 and Lough U.S. Pat. No. 766,365. Other patents which disclose apparatus and methods for cleaning or washing systems involving recycling of the cleaning fluid are Williams U.S. Pat. No. 3,295,538, Binnig U.S. Pat. No. 4,512,811, Duval U.S. Pat. No. 4,406,796, Zall U.S. Pat. No. 4,061,504 and Gilmore U.S. Pat. No. 3,413,149. None of the above noted cleaning and recycling systems provide all of the advantages of the present invention.

SUMMARY OF THE INVENTION

According to the present invention there is provided a settling tray which is filled with the effluent from a cleaning tank or the like. Paint or other lighter than water contaminates may be skimmed off the surface of the wastewater in such settling tray. The water is then pumped to the top of a settling tank which is divided into two separate compartments and provides for separation of the decontaminated water from the sludge. The sludge passes to the lower end portion of the tank and is withdrawn from the tank and is fed into a plurality of filter trays which filter the contaminates from the water remaining in the sludge. The filtrate from the filtering operation is recycled into the upper end of the settling tank. A return duct is provided for returning the decontaminated water from the settling tank to the cleaning fluid supply in the cleaning tank.

An object of the present invention is to provide a method and apparatus for removing the contaminates from the wastewater of a cleaning tank and recycling the water to the cleaning tank.

Another object of the present invention is to provide a wastewater treatment system in which contaminates are removed from the wastewater in a settling tank and the sludge from the setting tank is filtered and the filtrate recycled to the settling tank.

Other objects and many of the attendant advantages of the present invention will become more readily apparent upon consideration of the following detailed specification when considered in connection with the accompanying drawings wherein:

BRIEF DESCRIPTION OF THE DRAWINGS

FIG. 3 is a sectional view of a filter tray and; and

DESCRIPTION OF THE PREFERRED EMBODIMENT

Figure 1:
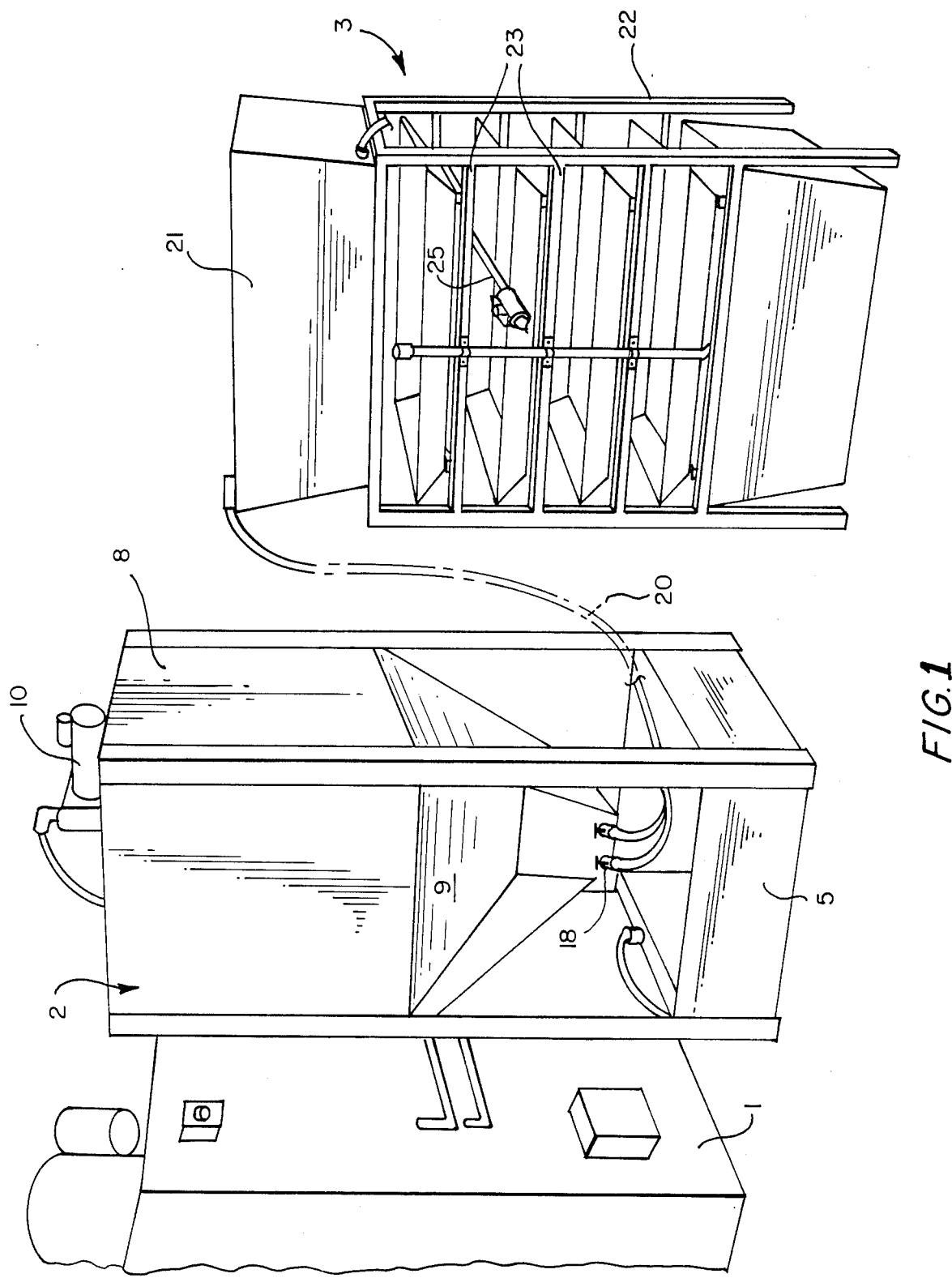
FIG. 1 is a perspective view showing the cleaning tank and wastewater treatment system.

Referring now more specifically to the drawings there is shown at 1 in FIG. 1 a cleaning tank. This cleaning tank is of any conventional design and includes a chamber for receiving an article to be cleaned or painted. A hose or spraying device is provided and a drain is disposed in the floor of the tank for disposing of the wastewater. The wastewater treatment system comprises a settling tank 2 and a filtration system 3 for treatment of the wastewater and for providing means for recycling the decontaminated water back to the feed for the cleaning tank 1.

Figure 2:
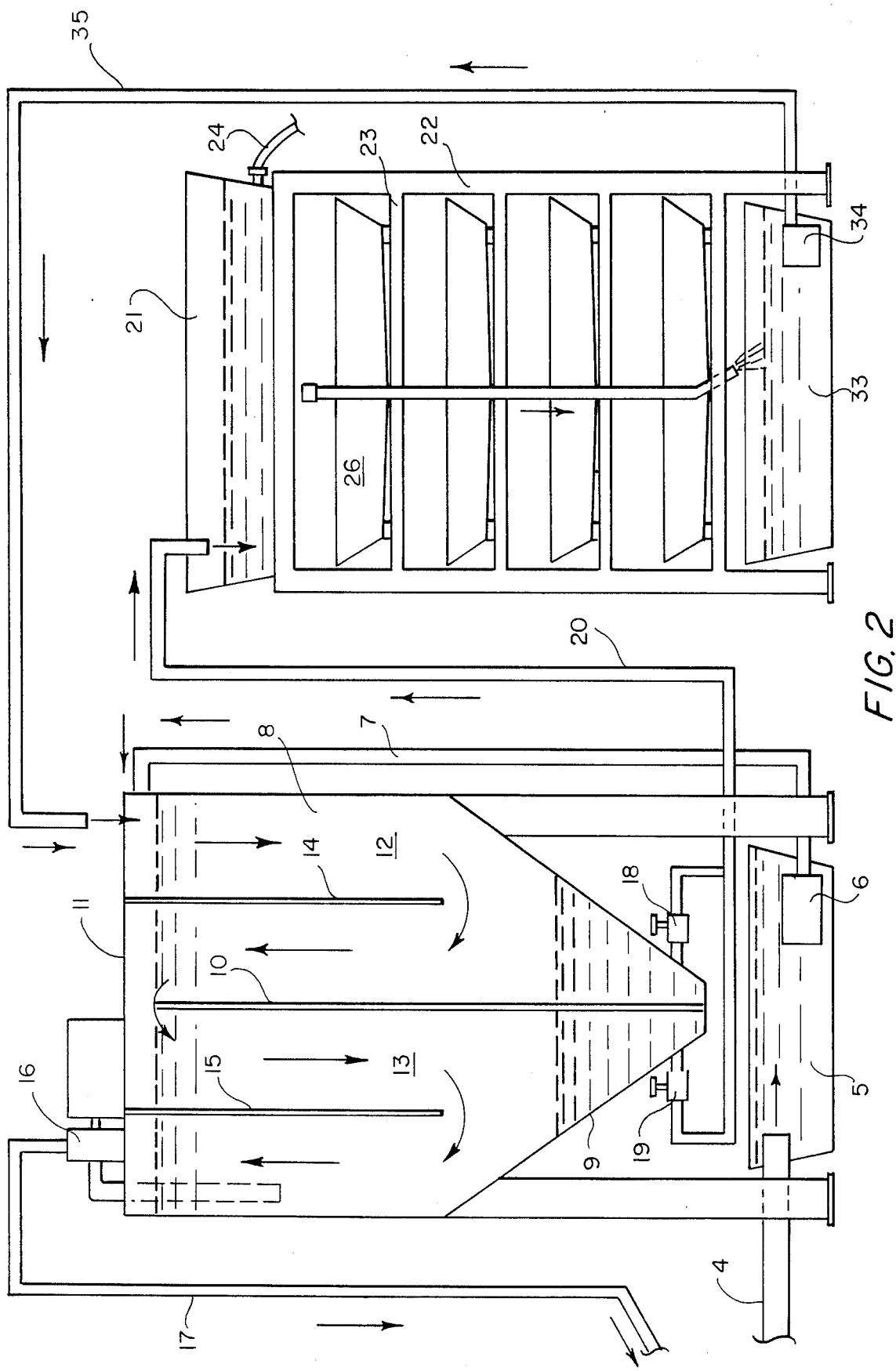
FIG. 2 is an elevational view partly in section showing the details of construction of the apparatus for wastewater treatment.

As more clearly shown in FIG. 2 the drain from the cleaning tank 1 is connected to a pipe or hose 4 which receives the wastewater from the cleaning tank and feeds it into a settling tray 5. The wastewater accumulates in this tray and paint or other contaminates in the water will float in the settling tray and can be skimmed off from the water. A pump 6 is disposed within the settling tray in the lower portion of the tray and pumps the wastewater through a feed pipe 7 into the upper end of a settling tank 8.

The settling tank 8 has a tapered lower end portion 9 and is provided with a central wall 10 extending the full width of the tank 8 and extending from the lower end up to a point spaced from the upper end wall 11. The central wall 10 divides the settling tank 8 into two chambers 12 and 13. Each chamber is provided with a dividing partition 14 and 15 which extend from the upper end wall 11 to a point spaced above the lower end of the settling tank 8. The feed pipe 7 for the settling tank feeds into the chamber 12 and fills the chamber 12 on both sides of the dividing partition 14. The contaminates in the form of a sludge will sink into the tapered lower end 9 of the tank 8 and the cleaner water passes over the upper end of the central wall 10 into the chamber 13. A secondary separation step takes place within the chamber 13 with the contaminates settling into the lower end portion of the tank 8.

A pump 16 is provided at the upper end of the settling tank 8 and this pump draws off the cleaner water from the settling tank 8 and recycles this water to the cleaning tank 1 through a return pipe 17. The combination of the settling tray 5 for skimming off the contaminates which are lighter than water and the settling tank 8 which removes other contaminates provides a purifying system which cleans the water for reuse in the cleaning tank for up to a week of use. At that time the recycled water may have a pH of eleven or twelve and may require additional treatment in order to render it useful for cleaning radiators and the like. At this time an acid such as hydrochloric acid may be added to the liquid within the settling tank 8 to bring the pH down to a value of six which will have the effect of further eliminating contaminates from the recycled liquid.

There is provided a second stage system for concentrating the contaminates and providing additional filtered water for recycling purposes. This system includes valves 18 and 19 for removing the contaminates from chambers 12 and 13 respectively. A piping system 20 provides a gravity feed from the lower end of settling tank 8 to a holding tank 21 for the sludge. This holding tank 21 is disposed on the upper end of a rack 22 having a plurality of shelves 23. At the lower end of the holding tank 21 there is provided an outlet hose 24 having a control valve and nozzle 25 attached to the end thereof. The nozzle 25 is of a length approximately equivalent to the length of the rack 22 and is provided with a plurality of spaced openings along the length thereof.

Figure 3:
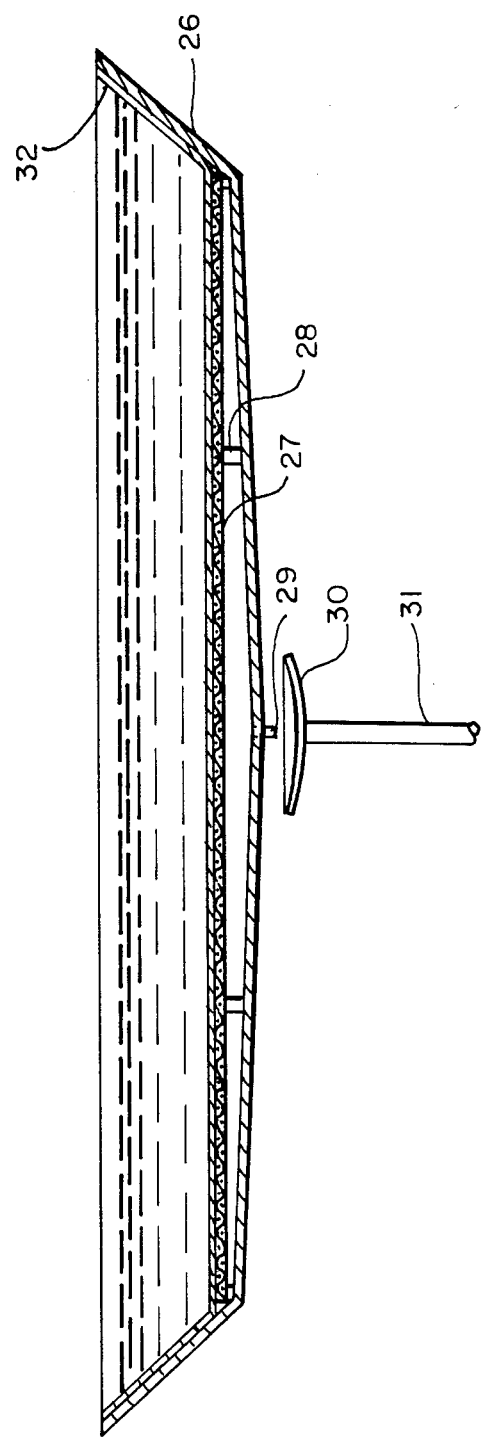
Figure 4:
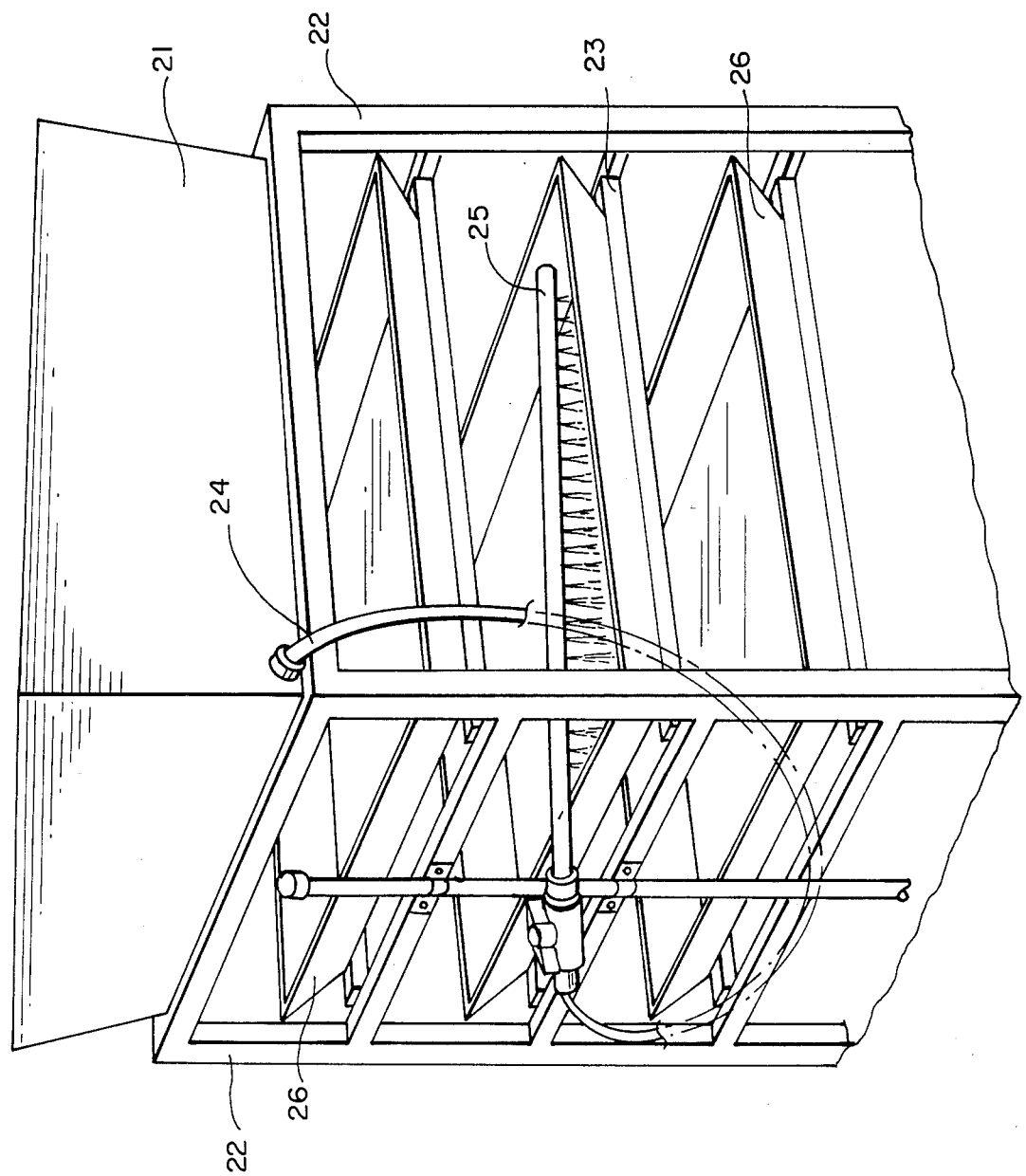
FIG. 4 is a perspective view of the system for filling the filter tray.

On each of the shelves 23 of the rack 22 there is disposed a filter tray 26 which is shown in cross section in FIG. 3. There is provided within the lower end of the filter tray a screen 27 which is supported above the tapered bottom wall of the tray 26 by means of support bars 28. As shown in FIG. 3 the bottom wall of the filter tray is sloped to a central outlet 29 so that liquid passing through the screen will flow through the outlet 29 to a filtrate basin 30 and a manifold pipe 31. A disposable filter paper 32 is provided within the filter tray so that when sludge is fed to the filter tray from the holding tank 21 the contaminates will collect on the filter paper with the liquid passing through the filter, screen 27 and through the manifold pipe 31 to a filtered water tank 33.

A pump 34 is provided within the filtered water tank 33 and a return pipe 35 carries the filtered water from the tank 33 back to the upper end of settling tank 8.

When the filter tray is filled with the heavy mud-like contaminates which remain on the top of the filter paper 32 the contaminants may be dried and disposed of in a hazardous waste dump. Thus, a recycling system is provided for a cleaning tank which prevents hazardous waste from reaching the sewage system and which provides for removing contaminates to a sufficient degree to permit recycling of the cleaning liquid.

Obviously many modifications and variations of the present invention are possible in light of the above teachings.

What is claimed as new and is desired to be secured by Letters Patent is:

1. A method for treating the effluent from a cleaning tank having an inlet and outlet comprising the steps of passing the wastewater from the outlet of the cleaning tank into a settling tray, skimming the floating contaminates from the settling tray, passing the wastewater to the inlet of a settling tank having a plurality of interconnected passageways therein, collecting the sludge from the bottom of the settling tank, pumping the sludge into a holding tank, collecting the contaminates in the sludge on a plurality of filter trays, passing the filtrate from the filter trays to the inlet of the settling tank, and feeding the outlet from the settling tank to the inlet of the cleaning tank.

2. A wastewater treatment system for the effluent from a cleaning booth having a cleaning fluid inlet and a wastewater outlet, a feed pipe for delivering wastewater from the cleaning booth, a settling tray connected to said feed pipe for providing for removal of floating contaminates in the wastewater, a settling tank having a plurality of interconnected passageways therein, means connecting said settling tray with an inlet at the upper end of said settling tank, means for removing sludge from the lower end of said settling tank, a holding tank, means for delivering the sludge from the lower end of said settling tank to said holding tank, a plurality of filter trays, hose means for delivering the sludge from the holding tank to the plurality of filter trays, means for delivering the filtrate from said filter trays to the inlet at the upper end of said settling tank, and means for connecting the outlet of said settling tank to the inlet of said cleaning booth.

3. A wastewater treatment system according to claim 2 wherein said settling tank includes a two stage separation system including a central wall extending from the bottom of said tank to a point spaced from the upper end of the tank and a dividing partition disposed on each side of said central wall, each dividing partition extending from the top of the tank to a point spaced from the bottom wall of said tank whereby wastewater fed into the settling tank on one side of the dividing partition passes under the dividing partition and over the central wall before being withdrawn on the opposite side of the tank.

4. A wastewater treatment system according to claim 2 and further including a manifold pipe system for collecting the filtered water from said plurality of filter trays.

5. A wastewater treatment system according to claim 4 and further including a rack for removably supporting said filter trays, each of said filter trays having a filtrate outlet therein for connection to said manifold pipe system.

* * * * *